Dec. 19, 1933.   H. M. GREIST ET AL   1,939,847
ELECTRICALLY OPERATED POTATO PARER
Filed Feb. 26, 1931   3 Sheets-Sheet 1
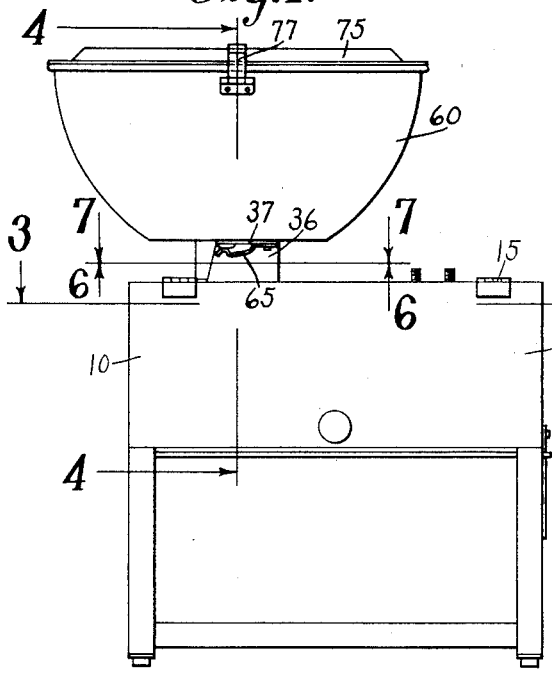
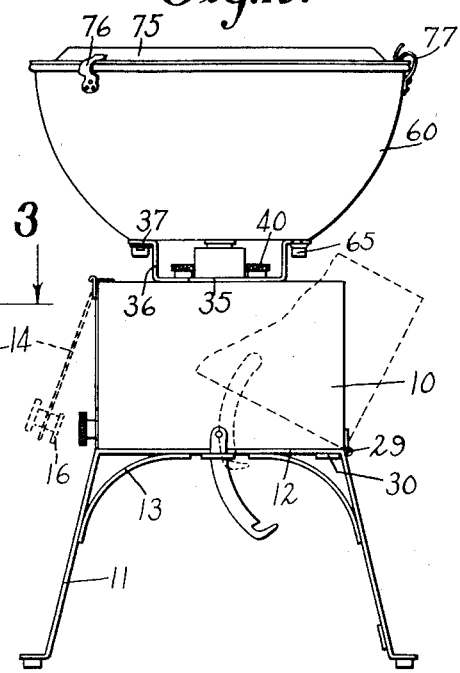
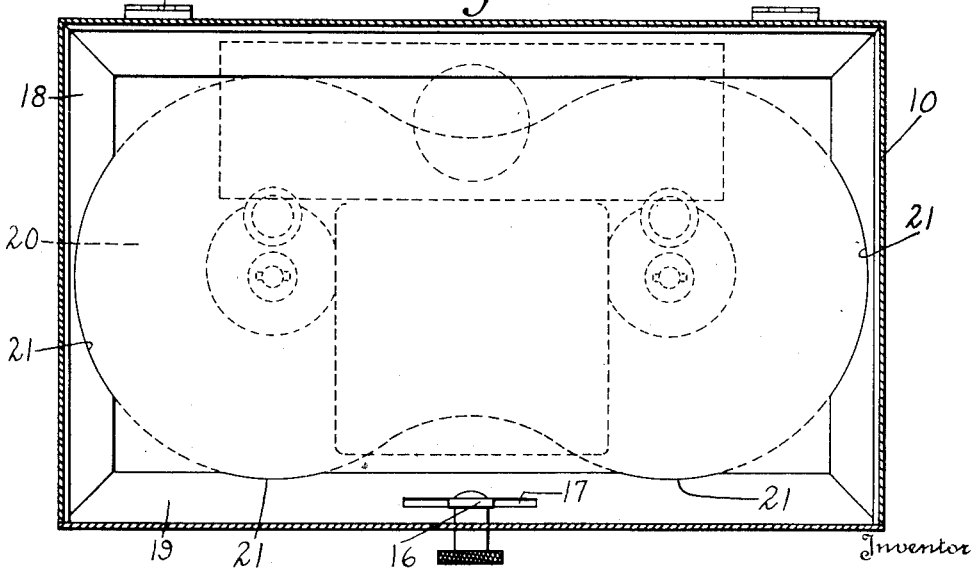

Dec. 19, 1933.   H. M. GREIST ET AL   1,939,847
ELECTRICALLY OPERATED POTATO PARER
Filed Feb. 26, 1931   3 Sheets-Sheet 2
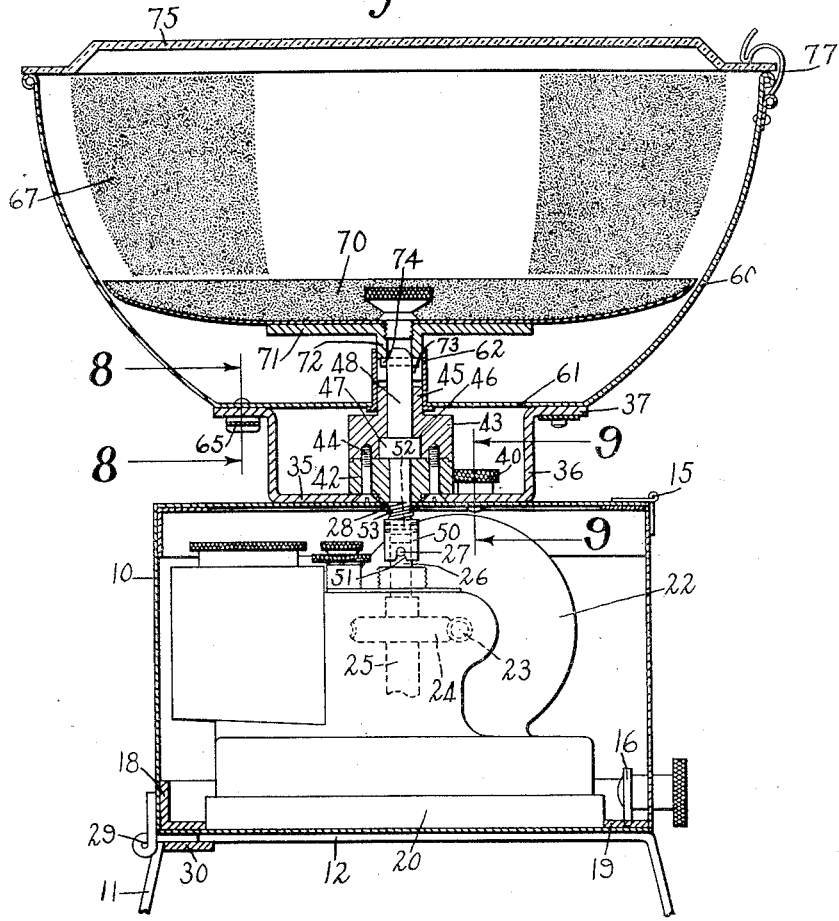
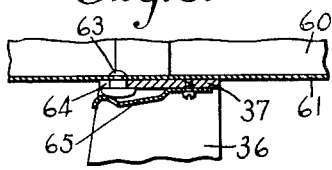
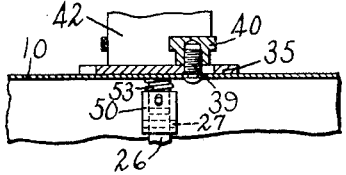

Dec. 19, 1933.   H. M. GREIST ET AL   1,939,847
ELECTRICALLY OPERATED POTATO PARER
Filed Feb. 26, 1931   3 Sheets-Sheet 3
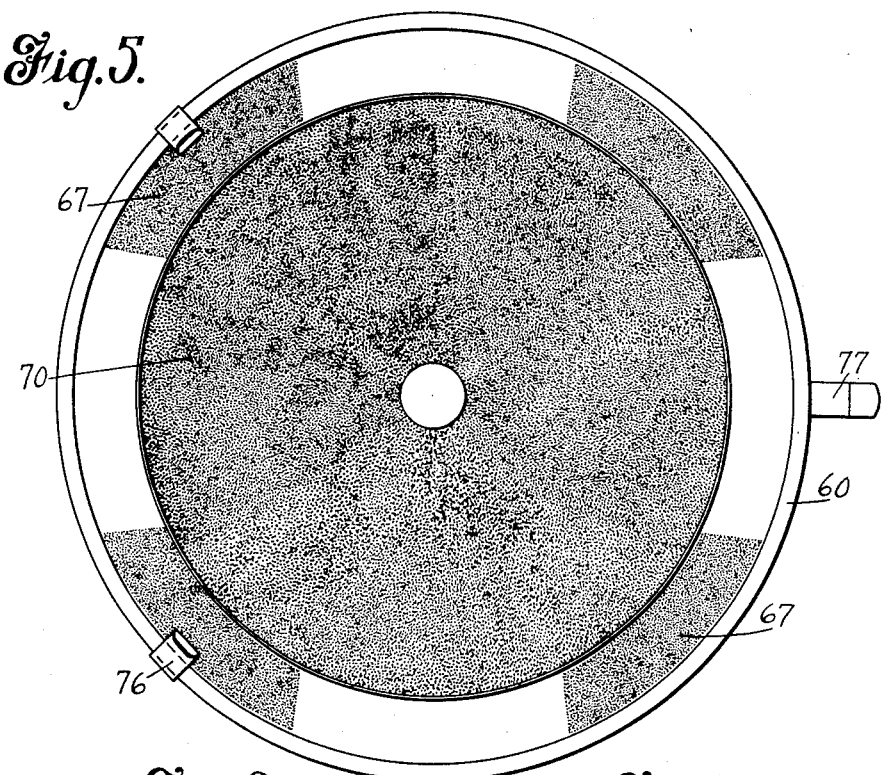
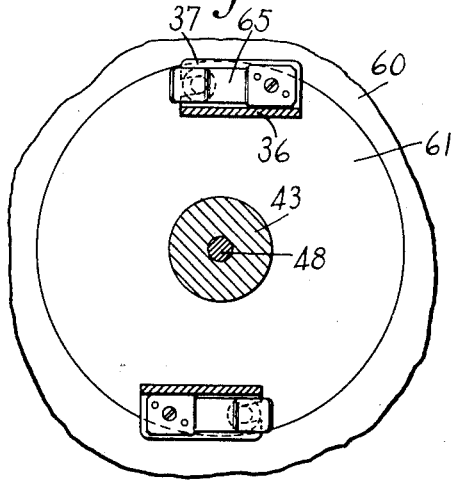
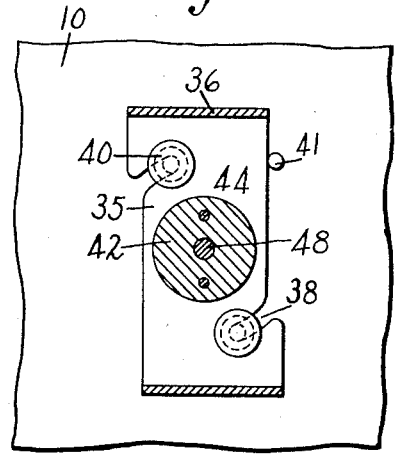
Inventor
Hubert M. Greist
and George L. Hinman
By Rockwell & Bartholow
Attorneys Patented Dec. 19, 1933

1,939,847

UNITED STATES PATENT OFFICE 1,939,847

ELECTRICALLY OPERATED POTATO PARER

Hubert M. Greist and George L. Hinman, New Haven, Conn., assignors to Greist Manufacturing Company, New Haven, Conn.

Application February 26, 1931. Serial No. 518,365

3 Claims. (Cl. 146—49)

This invention relates to the provision of means whereby an electric motor may be used in connection with various household electrically driven appliances. It has to do especially with the provision whereby the motor of one electrically driven appliance may be utilized to drive other appliances such, for example, as a potato parer. It is, of course, contemplated that appliances other than the potato parer may be driven from the motor, the embodiment shown being merely illustrative of one means of employing the novel principles and features of the invention.

A further object of the invention is the provision of a new and improved potato parer which will be simple and economical in construction, easy of operation, and at the same time efficient and practical.

A further object of the invention is the provision of a household appliance such as a potato parer with means whereby it may be supported and operated by the electric motor of another household appliance.

Still another object of the invention is the provision of a support for a household electric appliance having a motor, the support being of such nature and construction that various appliances to be driven from the motor may be carried either above or below the same and driven from the shaft thereof, and may be supported by the motor support in operative relation to the motor shaft.

To these and other ends, the invention consists in the novel features and combinations of parts to be hereinafter described and claimed.

In the drawings:

Fig. 1 is a front elevational view of a potato parer and support therefor embodying my improvements;

Fig. 2 is a side view of the part shown in Fig. 1;

Fig. 3 is an enlarged sectional view on line 3—3 of Fig. 1, showing the interior of the box for containing the motor structure;

Fig. 4 is an enlarged sectional view on line 4—4 of Fig. 1;

Fig. 5 is a top plan view of the bowl of the potato parer;

Fig. 6 is a sectional view on line 6—6 of Fig. 1;

Fig. 7 is a sectional view on line 7—7 of Fig. 1, and

Figs. 8 and 9 are sectional views on line 8—8 and 9—9 of Fig. 4 respectively.

To illustrate a preferred embodiment of our invention we have shown a chest or case 10 of substantially rectangular shape supported upon a frame comprising legs 11 and horizontally disposed members 12 supported from the legs and held by braces 13. The chest or case 10 is substantially rectangular in shape and is provided with a front face 14 which is hinged at 15 and adapted to be locked in closed position by a bolt 16 which takes into a slot 17 in the lower surface of the chest.

Referring particularly to Fig. 4, it will be observed that angle members 18 are secured about the lower edges of the case except at the front thereof where a plate 19 is provided lying against th case bottom in abutting relation. This not only strengthens the case, but also provides for the firm location of the motor-carrying device which in this instance is provided with a base portion 20, the outline of which is shown in dotted lines in Fig. 3, and it will be apparent that the horizontal portions of the angle members 18 and the member 19 are provided with cut-out portions or recesses 21 within which the base of the machine accurately fits so that it will not only be held against vibration, but the driving portions of the device will be accurately located with respect to openings in the case or chest 10 through which are passed the driving shafts leading to the electrical appliances.

Upon the base 20 of the motor device, as shown in Fig. 4, is carried a motor 22, the shaft 23 of which engages a worm wheel 24 on a vertical shaft 25. This shaft 25 is continued upwardly, as shown at 26, and provided with a transversely extending pin 27, the ends of which project from the shaft on both sides. The upper surface of the case 10 is provided with an opening 28 which is in line with the shaft 25 when the motor is correctly located in place within the case.

As it is also contemplated to place certain appliances below the case 10 to be driven from the shaft 25, the entire case is hinged to the supporting legs by hinges 29 secured on longitudinally extending frame members 30.

While it may not be necessary in connection with all appliances which may be used in connection with the motor structure shown, in the illustrated case of the potato parer, we prefer to use what we term an adapter which will be secured upon the top of the case 10 and in turn support the potato parer and will also provide a mounting for a shaft connecting the rotating parts of the potato parer with the shaft 26.

In the form shown this adapted comprises a U-shaped member having a base 35 and legs 36, which are provided with outwardly turned horizontally extending flanges 37. As shown in Fig. 7, the base is provided with arcuate slots 38 adapted to receive threaded pins 39 secured to the top member of the case 10 and which are adapted to receive thereupon knurled nuts 40 to secure the adapter rigidly in place. Also secured to the top of the case 10 is a pin 41 which abuts the base 35 of the adapter and prevents any tendency of the latter to rotate and thus carry the slots 38 away from the pins 39. This stop 41 is very short and is approximately equal in length to the thickness of the base portion 35 so that it will be apparent that the nuts 40 may be backed off a turn or so and the adapter raised sufficiently to clear the stop 41 whereupon it may be rotated so that the pins 39 will be clear of the slots 38 and it can then be removed from position.

Upon the base portion 35 of the adapter are a pair of bearing blocks 42 and 43, these blocks being secured together and to the adapter by means of the screws 44. The upper of the two blocks 43 is provided with a neck 45 and a recess 46 within which recess lies a thrust collar 47 on a shaft 48 which passes through openings in both blocks and is rotatably mounted therein.

On the lower end of this shaft is slidably but non-rotatably mounted a collar 50 having at its lower ends slots 51 to receive the pin 27. A pin 52 passing through the shaft 48 serves to prevent rotation, but to permit sliding movement, of the collar on the shaft. The collar is urged downwardly against the pin 52 by the spring 53.

It will be apparent that the motor may not always be stopped in the proper position for the slots 51 to register with the pin 27 when the adapter is secured in place. If such is the case, the lower end of the colar 50 will engage the pin 27 and the collar will be forced upwardly against its spring a sufficient distance to allow the adapter to be clamped in place by means of the nuts 40. Thereafter when the current is turned on and the shaft 26 starts to rotate, the collar 50 will be dropped into place under the force of the spring 53 with the pin 27 resting in the slots 51 so that a driving connection will be made between the shafts 26 and 48.

The potato parer which we have selected to illustrate and describe as the appliance to be driven from the motor comprises an outer bowl-shaped container 60 which may be made of any suitable material, the walls of the bowl being somewhat rounded and flaring upwardly as is usually the case with vessels of this shape and the bottom having a substantially flat portion 61. At substantially the central portion of the bottom is provided a sleeve 62 which surrounds the neck 45 of the block 43 and also surrounds the upper end of the shaft 48. The bottom portion 61 of the bowl is adapted to seat upon the horizontally extending flanges 37 on the adapter, and in the bottom of the bowl are provided headed pins 63, shown more especially in Figs. 6 and 8. The portions 37 of the adapter are provided with slots 64 which open through the side edges of the portions 37 and on the lower surfaces of these members are provided springs 65 which are designed to spring over the heads of the pins 63 so as to hold the bowl 60 firmly but detachably in place. It will be apparent that the bowl can be engaged and disengaged from the adapter by a slight rotary movement under a force sufficient to overcome the tension on the springs 65.

The sides of the bowl 60 are provided with spaced sections 67 covered with an abrasive material, the sides of the bowl between these sections being left smooth or in their natural condition. The width of the abrasive sections and the number thereof arranged around the periphery of the bowl may be varied as desired. We have found, however, that four of such sections, as shown in the drawing, do very satisfactory work.

Rotatably mounted within the bowl 60 is a plate-like rotor or impeller 70. As shown particularly in Fig. 4, this impeller is slightly dished or concave upon its upper surface so that toward its periphery edge the surface of the impeller slopes upwardly substantially merging at its edge with the rounded flaring interior surface of the bowl 60. The upper surface of the impeller is covered with an abrasive similar to that which is placed upon the sections 67 of the bowl. Upon the lower surface of the impeller is a plate 71 provided with a downwardly projecting sleeve 72 which telescopes within the sleeve 62 and is provided in its lower edge with notches 73 to receive the extended ends of a pin 74 secured to the shaft 48. The impeller is thus supported non-rotatably upon this shaft out of contact with the bowl so that it will rotate freely within the bowl when the shaft 48 is rotated by the motor.

A cover 75 may be provided for the bowl, the edges of which may be slipped under clips 76 provided upon the edge of the bowl and under a hinged catch 77 which is so arranged that the cover may be readily removed and replaced when desired. The operation of the device is as follows:

It will be apparent that, when the shaft 25 is rotated by the motor, the shaft 48 will also be rotated due to the location of the pin 27 in the notches or recesses 51 upon the sleeve. The rotation of the shaft 48 will effect the rotation of the rotor or impeller plate 70. It will be understood that the potatoes to be pared are placed in the bowl on the plate 70 and the rotation of this plate will cause them to be moved around the bowl against and past the abrasive regions 67. Due to the dished shape of the plate 70, as well as to the rounded flaring shape of the wall of the bowl 60, the potatoes will not merely be carried around upon the plate, but will ride up the sides of the bowl due to the action of centrifugal force and the shape of the parts, and thus will be effectively carried over the abrasive portions 67. Also due to the fact that these abrasive regions are discontinuous, being separated by smooth portions of the bowl, there will be no tendency for the movement of the potatoes to be retarded so that they will be held against movement while the impeller plate continues its rotation. If the movement of the potatoes around the bowl were considerably retarded, it would result in the surface of the potatoes next to the impeller plate being unduly ground off by this plate, while the remaining portions would not be subject to grinding action. When, however, the abrasive portions are spaced apart, as shown, the movement of the articles to be treated is not retarded to an excessive extent, but on the other hand the articles are continually moved across the abrasive surfaces and turned about so that all portions of their surfaces come in contact with the abrasive and the skin or peel is effectively removed. Moreover when the bowl and impeller plate are shaped as shown, the potatoes will continually be forced upwardly over the sides of the bowl and will fall back upon the impeller so that all parts of their surfaces will be presented to the abrasive.

While we have shown and described a preferred embodiment of our invention, it will be understood that it is not to be limited to all of the

What we claim is:

1. In a potato parer, a bowl-shaped container having an outwardly flaring curved side wall, a plate-like member rotatably mounted within said container adjacent the bottom thereof, and means for rotating said member, the side wall of said container being provided with rough surface sections extending generally vertically thereon and smooth portions between said sections.

2. In a potato parer, a bowl-shaped container having an outwardly flaring curved side wall, a plate-like member rotatably mounted within said container adjacent the bottom thereof, and means for rotating said member, the side wall of said container presenting a rough surface at certain sections thereof and a smooth surface between said sections, and said plate-like rotator having a rough upper surface, said rough and smooth surface sections being arranged alternately in horizontal series about the container wall.

3. In a potato parer a container having a generally upstanding side wall, a rotatable shaft extending upwardly through the bottom of the container, a plate-like member mounted at the upper end of said shaft and adapted to be rotated thereby, said plate-like member having a roughened upper surface, and the side wall of said container presenting a rough surface at certain sections thereof extending upwardly from said plate-like member and a smooth surface between said sections, and means for rotating said shaft.

HUBERT M. GREIST.
GEORGE L. HINMAN.